(12) United States Patent
Liao

(10) Patent No.: US 7,946,740 B2
(45) Date of Patent: May 24, 2011

(54) LIGHT-EMITTING APPARATUS AND PEDAL COMPRISING THE SAME

(75) Inventor: Juinne-Ching Liao, Taipei (TW)

(73) Assignee: Shen-Ko Tseng, Taipei (TW)

( * ) Notice: Subject to any disclaimer, the term of this patent is extended or adjusted under 35 U.S.C. 154(b) by 112 days.

(21) Appl. No.: 12/028,008

(22) Filed: Feb. 7, 2008

(65) Prior Publication Data

US 2009/0201688 A1    Aug. 13, 2009

(51) Int. Cl.
*F21V 33/00* (2006.01)
(52) U.S. Cl. .................. 362/473; 362/192; 362/540
(58) Field of Classification Search .......... 362/473–476, 362/192, 540–542; 310/73; 340/432
See application file for complete search history.

(56) References Cited

U.S. PATENT DOCUMENTS

| | | | | |
|---|---|---|---|---|
| 4,648,610 A * | 3/1987 | Hegyi | ............... | 280/11.19 |
| 5,590,946 A * | 1/1997 | Jung | ............... | 362/475 |
| 5,662,405 A * | 9/1997 | Kuo | ............... | 362/473 |
| 5,803,574 A * | 9/1998 | Szaniszlo | ............... | 362/551 |
| 5,857,762 A * | 1/1999 | Schwaller | ............... | 362/473 |
| 6,104,096 A * | 8/2000 | Hicks | ............... | 290/1 R |
| 6,454,445 B1 * | 9/2002 | Liaw et al. | ............... | 362/473 |
| 6,550,945 B2 * | 4/2003 | Chiu | ............... | 362/473 |
| 6,789,926 B2 * | 9/2004 | Chang | ............... | 362/473 |
| 2004/0066656 A1 * | 4/2004 | Tristram | ............... | 362/473 |
| 2005/0180150 A1 * | 8/2005 | Okada et al. | ............... | 362/473 |
| 2005/0243545 A1 * | 11/2005 | Watanabe | ............... | 362/192 |
| 2006/0076843 A1 * | 4/2006 | Chang | ............... | 310/87 |

* cited by examiner

*Primary Examiner* — Robert May

(57) ABSTRACT

The invention provides a light-emitting apparatus, which can be disposed on a manpower vehicle, including a light-emitting unit and a power-generating module. The power-generating module further includes a first magnetic conductor, a second magnetic conductor, and a coil. The first magnetic conductor is disposed on a first component of the manpower vehicle; the second magnetic conductor is disposed on a second component of the manpower vehicle, and the coil is coupled to the first magnetic conductor or the second magnetic conductor. Moreover, the first magnetic conductor or the second magnetic conductor includes a magnetic member. Particularly, the first component can apply a pre-set point as an axle to rotate, so that when a distance between the first magnetic conductor and the second magnetic conductor is changed, the coil is capable of generating an induced electromotive force for supporting the light-emitting unit with needed power.

2 Claims, 11 Drawing Sheets

LIGHT-EMITTING APPARATUS AND PEDAL COMPRISING THE SAME

BACKGROUND OF THE INVENTION

1. Field of the Invention

The present invention relates generally to a light-emitting apparatus, and more particularly, to a light-emitting apparatus disposed on a manpower vehicle and a pedal including the light-emitting apparatus.

2. Description of the Prior Art

With the rapid development of developing nations, the numbers of vehicles, such as cars or motorcycles, are also increased rapidly, so that the related problems such as traffic jams or environment pollution are getting serious. Therefore, due to traffic and environment, manpower vehicle such as bicycles is an optimal choice. Moreover, to increase the safety and fun, many bicycles have reflecting devices or light-emitting devices disposed on the frames or pedals.

The power source of the light-emitting device on a bicycle nowadays mainly comes from batteries or a power-generating device. For example, Taiwan patent publication no. 581041 discloses a light-emitting decoration for the pedal of bicycles. The light-emitting decoration of the prior art is embedded to outer surface of the shaft of the pedal of bicycles. Moreover, the light-emitting decoration includes a mounting base, a circular magnet, a coil base, a LED, and a transparent cover. By the six-angled recessive portion in the mounting base, the light-emitting decoration can be mounted to the six-angled screw nut of the shaft of the pedal. The circular magnet and coil base are disposed on the mounting base, and the LED on the coil base can be disposed in the transparent cover. Moreover, a plurality of tenons are applied to mount the light-emitting decoration on the pedal. When a user stamps on the pedal, the coil base and the circular magnet will rub against each other, so as to drive the LED to light.

Additionally, in the prior art, the power-generating/charging apparatus used in a bicycle applies the rotation of wheels to generate electronic power. For example, Taiwan patent publication no. 553873 discloses a power-supplying apparatus based on wheel. The power-supplying apparatus of the prior art mainly includes a mounting device mounted on the body of the bicycle, a power-supplying device mounted on the wheel, and a light-emitting element mounted on the power-supplying device. The power-supplying device is connected to the light-emitting element by electric wires; the mounting device contacts with the power-supplying device via a conductive element; and the mounting device can guide the electric wire to the light-emitting element to supply the power to the light-emitting element. However, because there are too many elements of the power-supplying apparatus, it is hard to assemble and maintain the apparatus.

SUMMARY OF THE INVENTION

Accordingly, the aspect of the present invention is to provide a light-emitting apparatus which can be disposed on a manpower vehicle. Particularly, the power-generating module of the light-emitting apparatus of the invention can be driven by the operation of the manpower vehicle to generate power needed by the light-emitting apparatus. Therefore, the light-emitting apparatus of the invention can provide illumination in an energy-saving way without a battery.

According to an embodiment, the light-emitting apparatus of the invention is disposed on a manpower vehicle and includes a light-emitting unit and a power-generating module. The power-generating module further comprises a first magnetic conductor, a second magnetic conductor and a coil. The first magnetic conductor is disposed on a first component of the manpower vehicle; the second magnetic conductor is disposed on a second component of the manpower vehicle; and the coil is coupled to the first magnetic conductor or the second conductor. Moreover, the first magnetic conductor or the second magnetic conductor comprises a magnetic member. Particularly, the first component can rotate around a pre-set point as an axle, so that when the distance between the first component and the second component is changed, the coil generates an induced electromotive force for supporting the light-emitting unit with needed power.

Another aspect of the invention is to provide a pedal which comprises a light-emitting apparatus. The pedal of the invention comprises a power-generating module which can be driven by the operation of the pedal to generate power for the light-emitting apparatus. Accordingly, the light-emitting apparatus of the pedal of the invention can provide illumination in an energy-saving way without a battery.

According to an embodiment of the invention, the pedal comprises a shaft, a main body, a light-emitting unit, and a power-generating module. The main body can rotate around the shaft as an axle, and the light-emitting unit is disposed on the main body. Moreover, the power-generating module further comprises a first magnetic conductor, a second magnetic conductor, and a coil. The first magnetic conductor is disposed on the shaft; the second magnetic conductor is disposed on the main body; and the coil is coupled to the first magnetic conductor or the second magnetic conductor. Furthermore, the first magnetic conductor or the second magnetic conductor comprises a magnetic member. Particularly, when the main body rotates around the shaft, the distance between the first magnetic conductor and the second magnetic conductor is changed so that the coil generates an induced electromotive force for supporting the light-emitting unit with needed power.

The objective of the present invention will no doubt become obvious to those of ordinary skills in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The invention provides a light-emitting apparatus which can be disposed on a manpower vehicle such as, but not limited to, bicycle, tricycle, or pedal boat.

Figure 1:
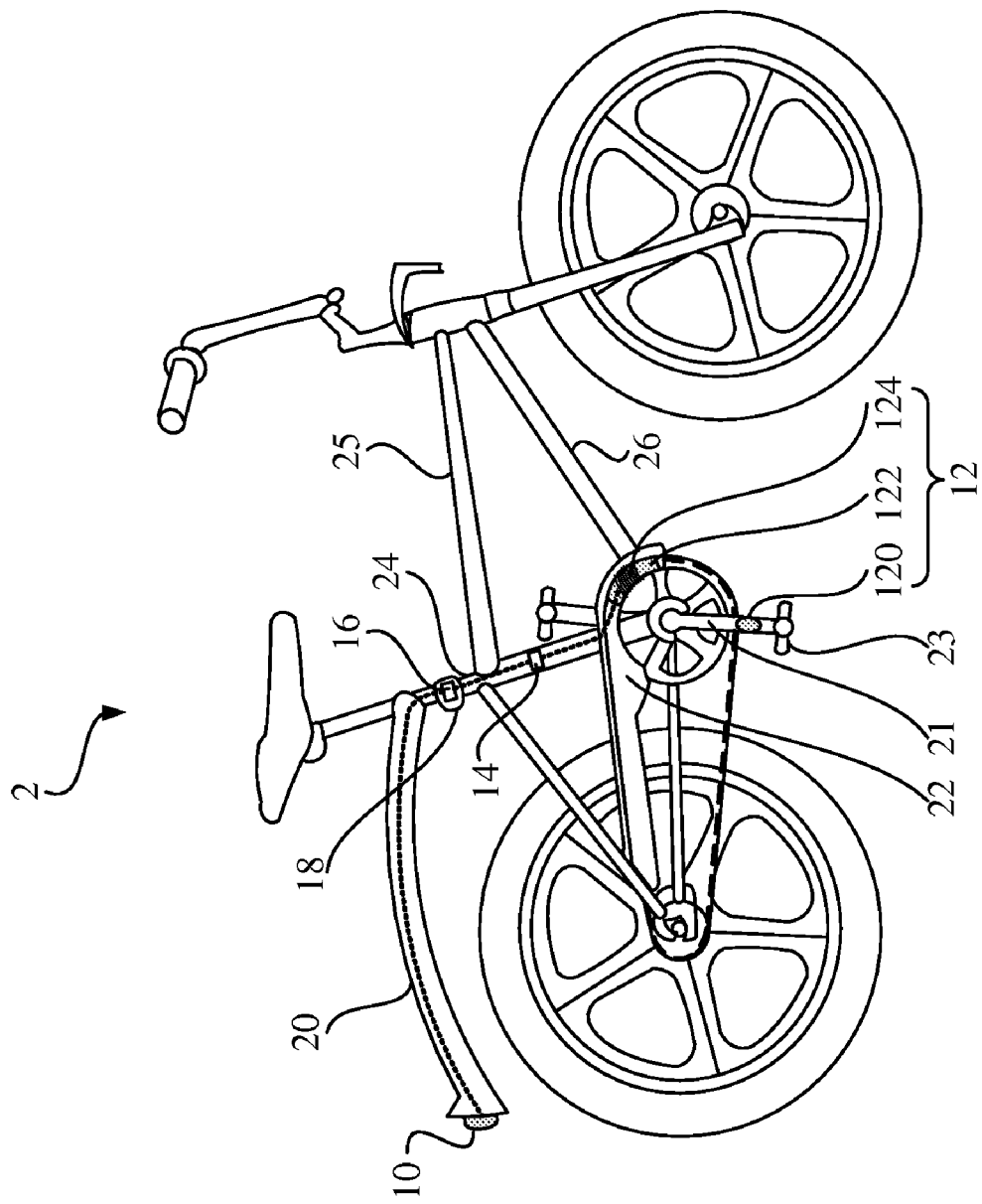
FIG. 1 illustrates a light-emitting apparatus of an embodiment of the invention disposed on a bicycle.

Please refer to FIG. 1, which illustrates a light-emitting apparatus of an embodiment of the invention disposed on a bicycle. As shown in FIG. 1, the light-emitting apparatus 1 can be disposed on the bicycle 2. Moreover, the light-emitting apparatus 1 includes a light-emitting unit 10, a power-generating module 12, a converting module 14, and a controller 16.

In practice, the light-emitting unit 10 can be disposed on any suitable positions but not limited to the fender 20 as shown in FIG. 1. In practice, the light-emitting unit 10 can include a plurality of LEDs. Moreover, the LEDs can comprise red light LEDs, blue light LEDs, green light LEDs, yellow light LEDs, or other suitable LEDs. Furthermore, in practice the plurality of LEDs can optionally be arranged to cooperate with the pre-determined ways to provide eye-catching illumination. For example, the LEDs can be arranged like a bar, array, or other shapes.

The power-generating module 12 further comprises a magnetic conductor 120, a magnetic member 122, and a coil. As shown in FIG. 1, in the embodiment, the magnetic conductor 120 is disposed on a crank arm 21; the magnetic member 122 is disposed on a protective cover 22; and the coil 124 is coupled to the magnetic member 122. When a user stamps on the pedal 23 of the bicycle 2, the crank arm 21 can be driven to rotate around an end thereof as an axle, so that the magnetic conductor 120 continuously comes near to or goes away from the magnetic member 122 on the protective cover 22. By the change of distance between the magnetic conductor 120 and the magnetic member 122, the coil 124 can generate an induced electromotive force for supporting the light-emitting unit 10 with needed power.

Please note that, in the embodiment, the magnetic conductor 120 represents the first magnetic conductor of the invention, and the magnetic member 122 represents the second magnetic conductor. However, in practice, the magnetic member itself can be the first magnetic conductor, or be disposed on the first magnetic conductor or the second magnetic conductor. Moreover, the coil of the invention can optionally be coupled to the first magnetic conductor or the second magnetic conductor.

The converting module 14 is disposed on the seat tube 24 of the bicycle 2, and it is electrically connected to the power-generating module 12, for converting the induced electromotive force to a direct current needed by the light-emitting unit 10. The controller 16 is also disposed on the seat tube 24, and more particularly, the controller 16 is disposed in a waterproof enclosure 18. The controller 16 is connected to the light-emitting unit 10 and the converting module 14 respectively for driving the light-emitting unit to light.

Figure 2:
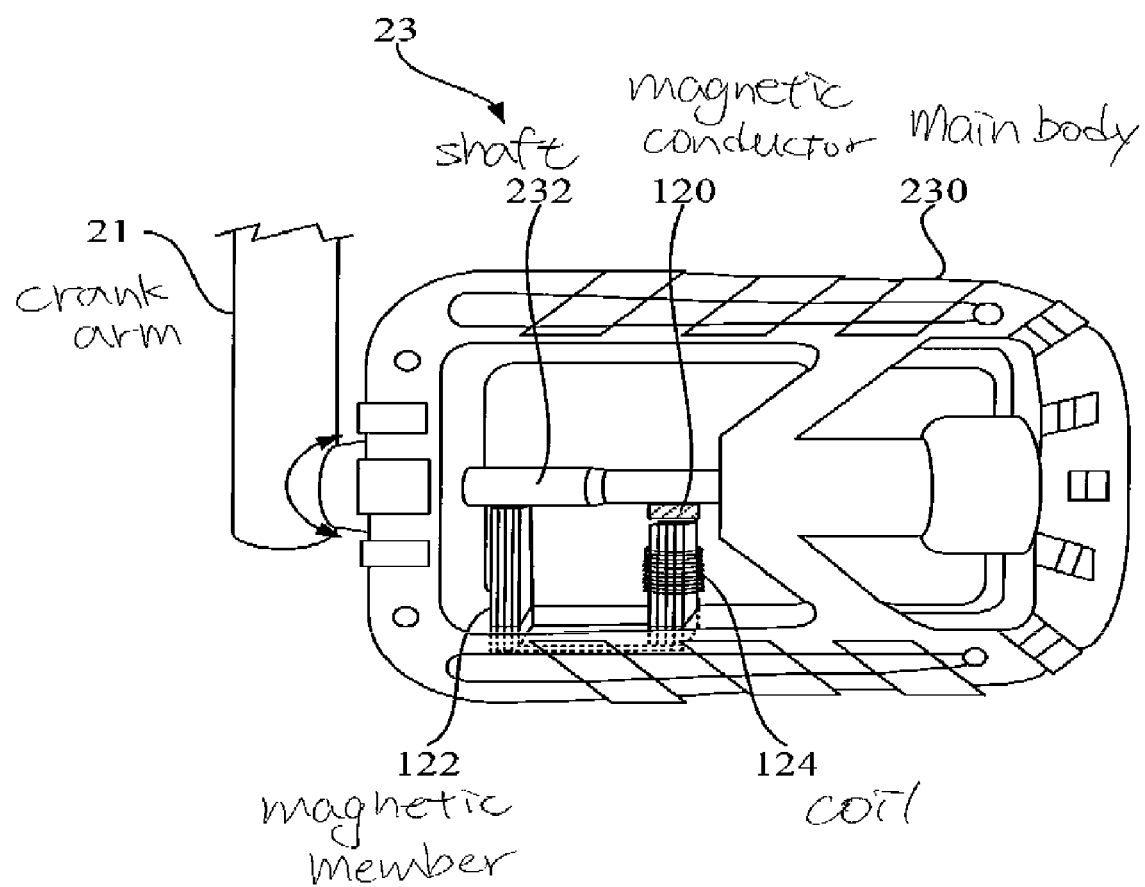
FIG. 2 shows a pedal of the invention.

Please refer to FIG. 2, which shows a pedal of the invention. As shown in FIG. 2, the pedal 23 includes a main body 230 and a shaft 232, and an end of the shaft 232 is rotatably connected to a crank arm 21, and the main body 230 can rotate around the shaft 232 as an axle. Furthermore, the above-mentioned magnetic conductor 120 is disposed on the shaft 232; the magnetic member 122 is disposed on the main body 230; and the coil 124 is coupled to the magnetic member 122. When a user stamps on the main body 230, the main body 230 can rotate around the shaft 232 as an axle. At that time, the distance between the magnetic conductor 120 and the magnetic member 122 is changed, so that the coil 124 generates an induced electromotive force for supporting the light-emitting unit (not shown) with needed power.

Figure 3:
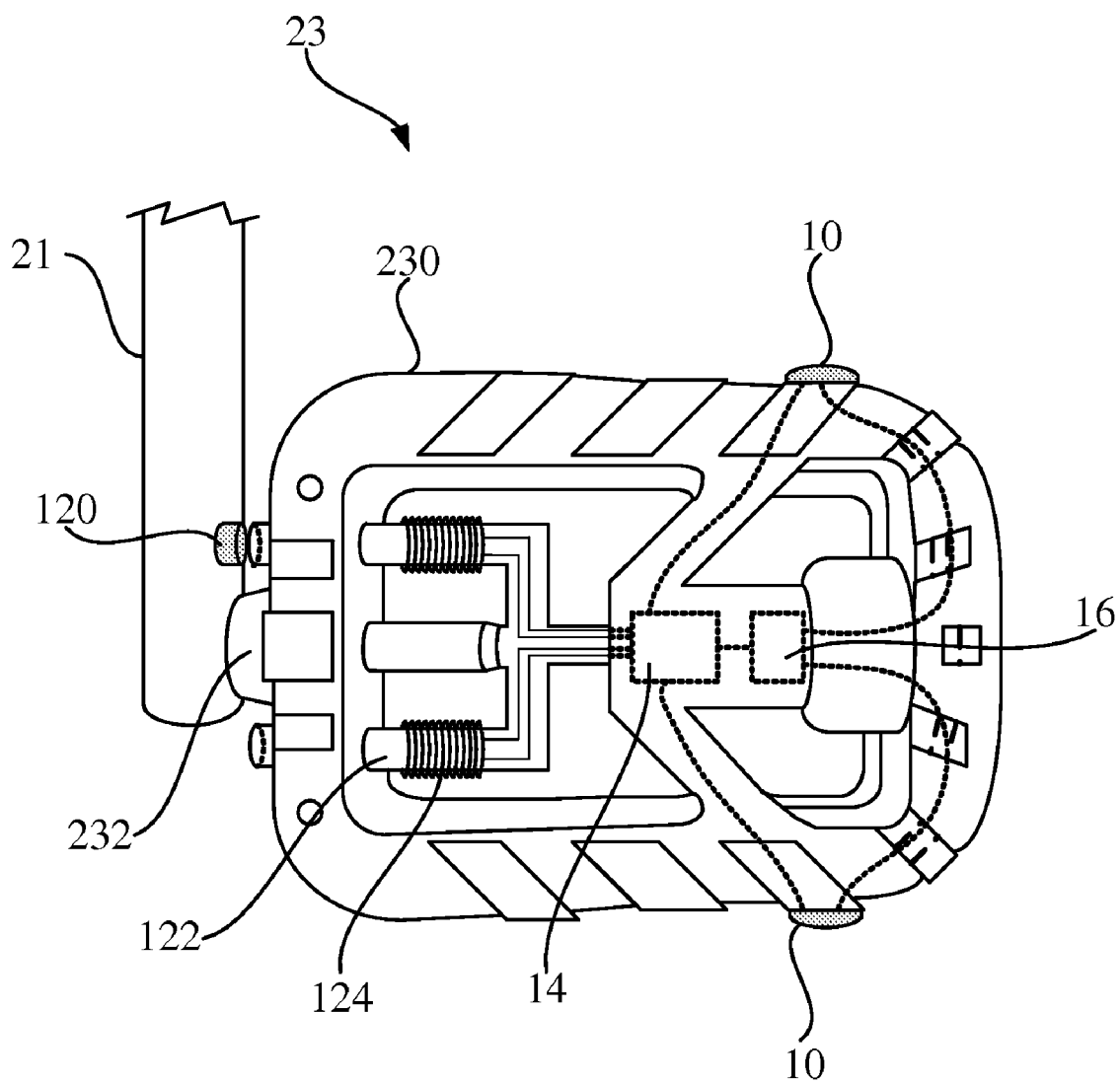
FIG. 3 shows a pedal and a crank arm of the invention.

Please further refer to FIG. 3, which shows a pedal and a crank arm of the invention. As shown in FIG. 3, the pedal 23 includes a main body 230 and a shaft 232, and an end of the shaft 232 is rotatably connected to the crank arm 21. Additionally, the above-mentioned magnetic conductor 120 is disposed on the crank arm 21, the magnetic member 122 is disposed on the pedal 23, and the end of the magnetic member 122 protrudes from the main body 230 and opposites to the magnetic conductor 120 on the crank arm 21. Similarly, the coil 124 is coupled to the magnetic member 122. Moreover, the above-mentioned converting module 14 and controller 16 are also disposed on the pedal 23, and the light-emitting unit 10 is disposed on one side of the main body 230.

When a user stamps on the pedal 23, the pedal 23 can rotate around the shaft 232. At that time, the protruding end of the magnetic member 122 comes close to the magnetic conductor 120, so that the coil 124 coupled to the magnetic member 122 can generate an induced electromotive. The converting module 14 can convert the induced electromotive force to a direct current and provide the current to the controller 16 and the light-emitting unit 10. The controller 16 is used for driving the light-emitting unit 10 to light. Practically, the controller 16 can drive the light-emitting unit to light in a pre-determined way.

Figure 4A:
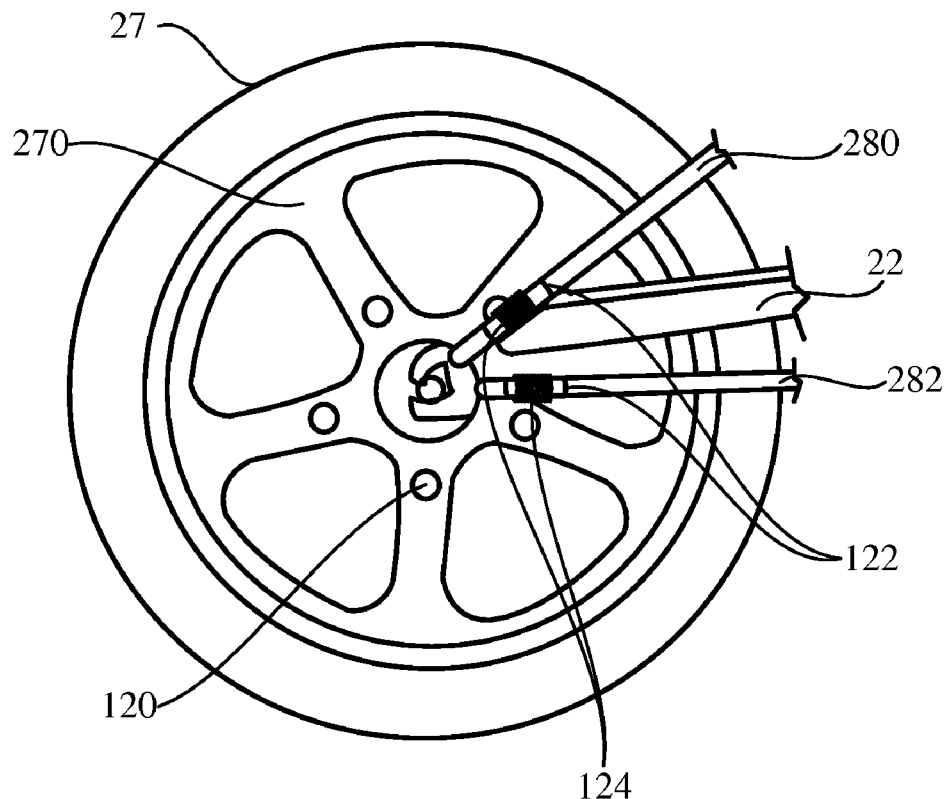
FIG. 4A shows the power-generating module of the invention disposed on the rear wheel of a bicycle.
Figure 4B:
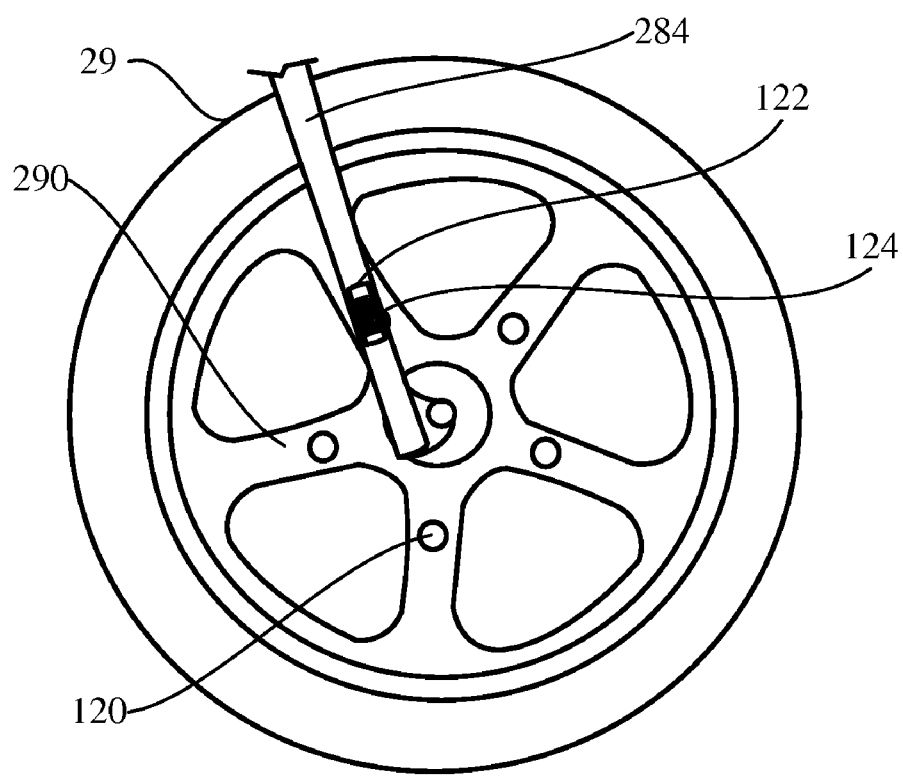
FIG. 4B shows the power-generating module of the invention disposed on the front wheel of a bicycle.
Figure 4C:
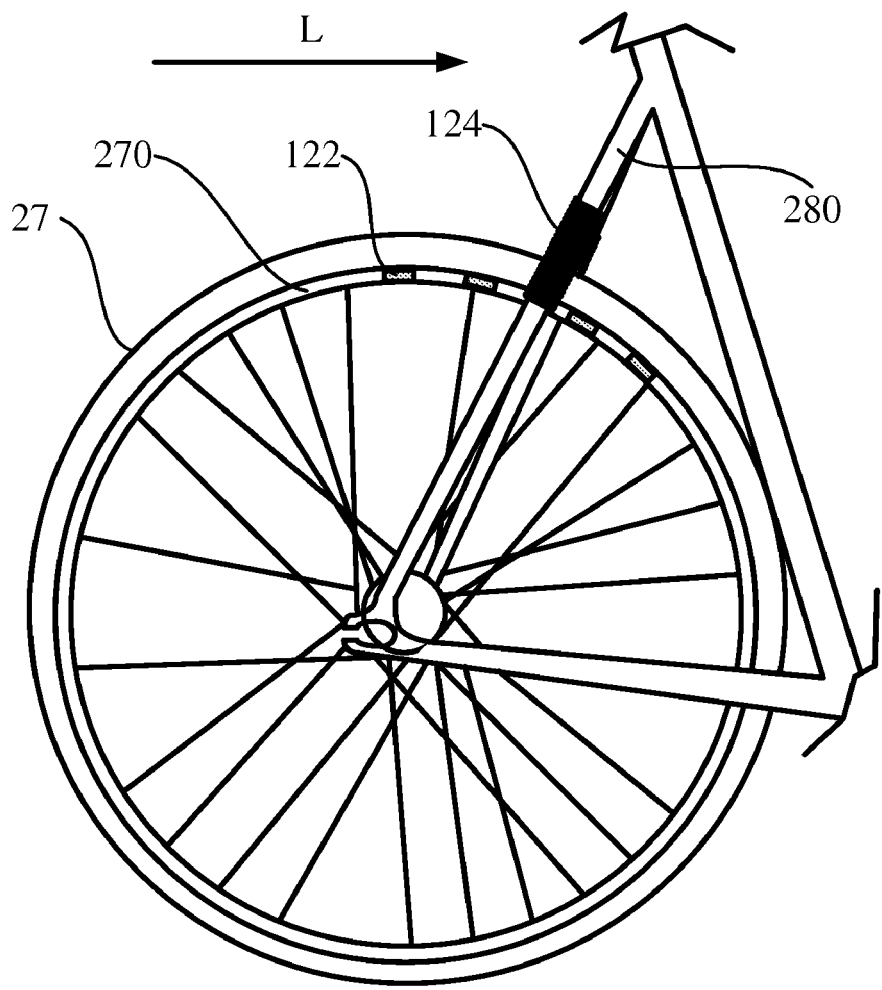
FIG. 4C shows the power-generating module of the invention disposed on a holder of the rear wheel of a bicycle.
Figure 4D:
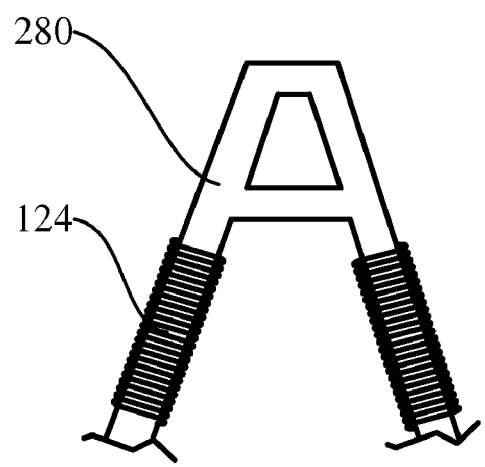
FIG. 4D shows the first holder of the rear wheel in FIG. 4C along the direction L.
Figure 4E:
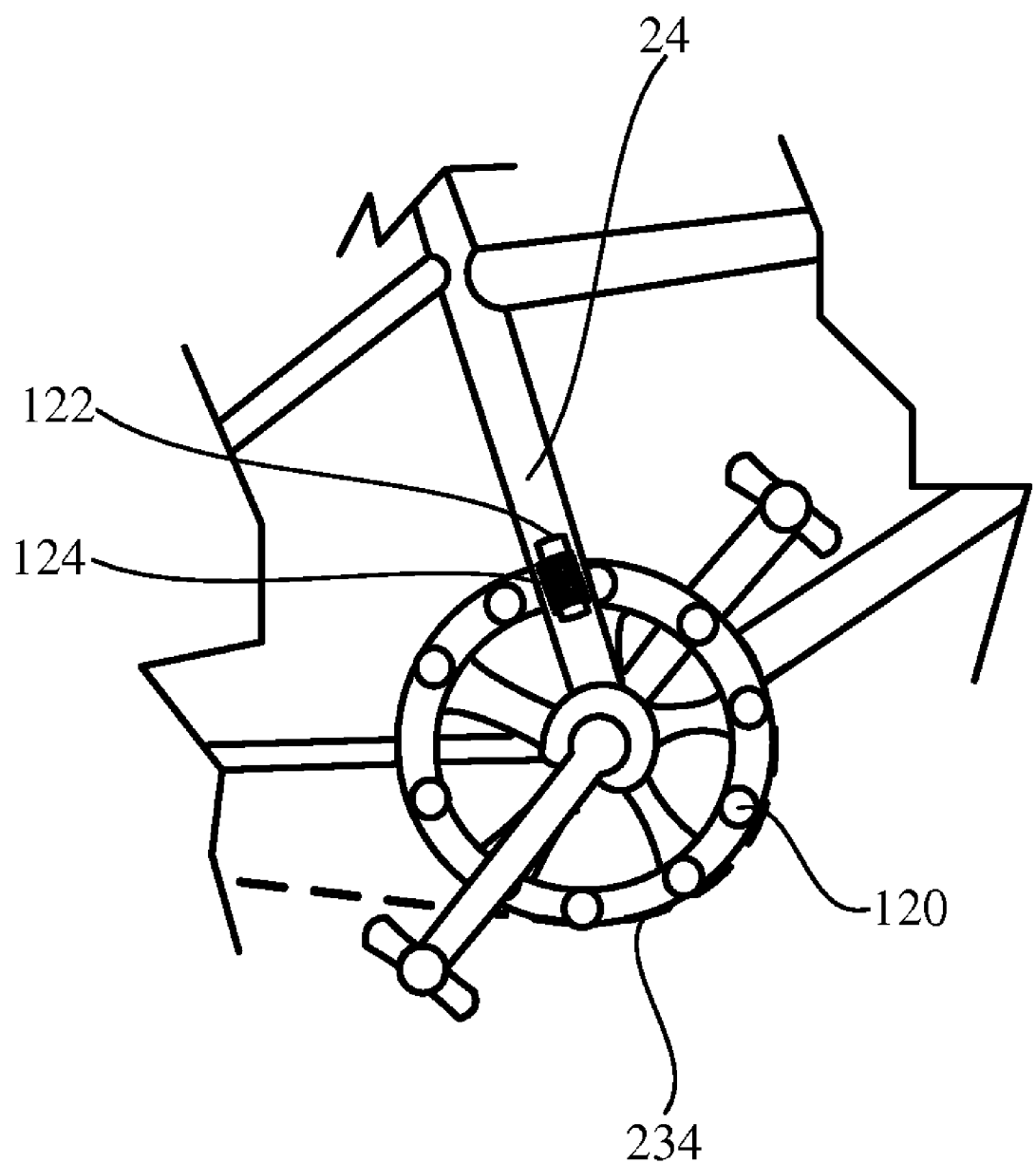
FIG. 4E shows the power-generating module of the invention disposed on a gear wheel and a seat tube of a bicycle.
Figure 4F:
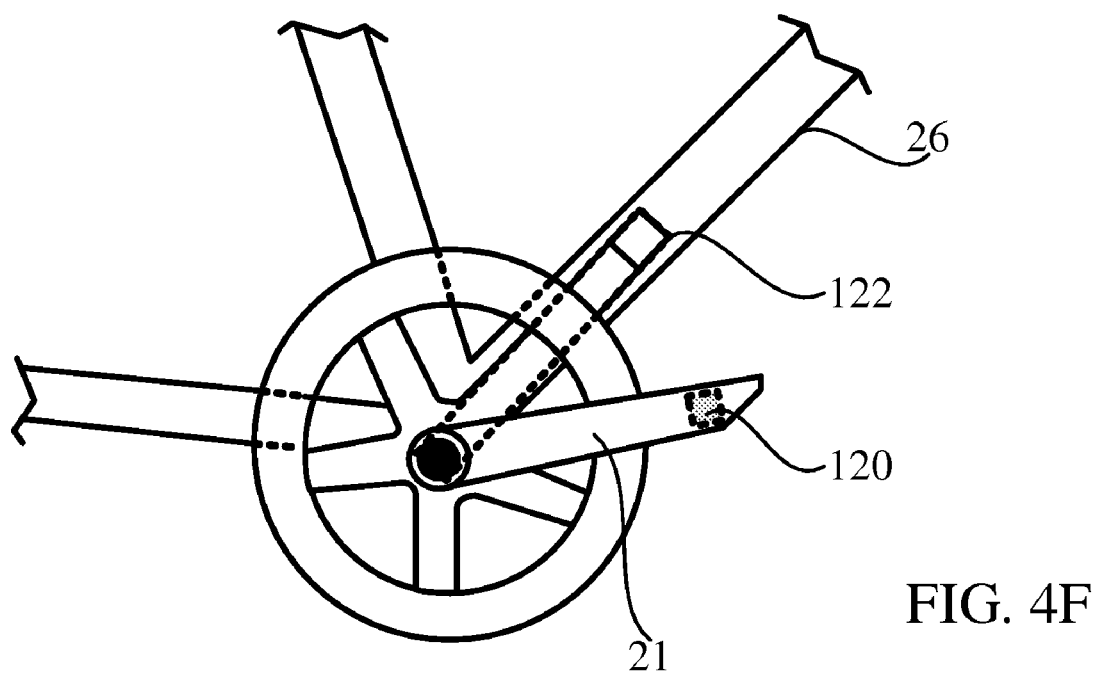
FIG. 4F and FIG. 4G illustrate the power-generating module of the invention disposed on a crank arm and a down tube of a bicycle.
Figure 4G:
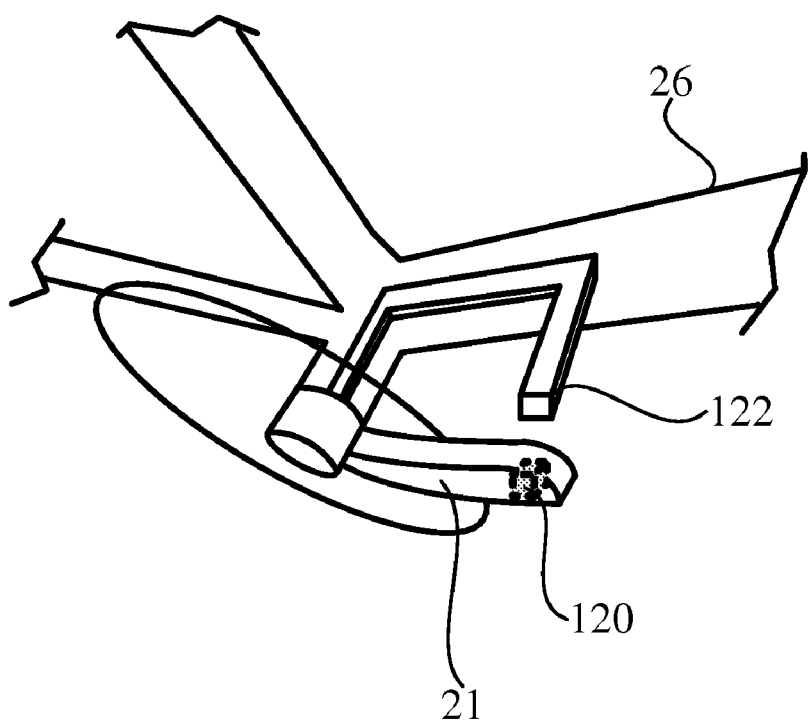

Please refer to FIGS. 4A to 4G, FIG. 4A shows the power-generating module of the invention disposed on the rear wheel 27 of a bicycle; FIG. 4B shows the power-generating module of the invention disposed on the front wheel 29 of a bicycle; FIG. 4C shows the power-generating module of the invention disposed on a holder of the rear wheel 27 of a bicycle; FIG. 4D shows the first holder 280 of the rear wheel 27 in FIG. 4C along the direction L; FIG. 4E shows the power-generating module of the invention disposed on a gear wheel 234 and a seat tube 24 of a bicycle; and FIG. 4F and FIG. 4G illustrate the power-generating module of the invention disposed on a crank arm 21 and a down tube 26 of a bicycle.

As shown in FIG. 4A, the magnetic conductor 120 of the power-generating 12 of the invention can be disposed on the frame 270 of the rear wheel 27, whereas the magnetic member 122 and the coil 124 can be disposed on the first holder 280 and or the second holder 232 of the rear wheel 27. When the rear wheel 27 is rotating, the distance between the magnetic conductor 120 on the frame 270 and the magnetic member 122 on the holders 280, 282 is changed, so that the coil 124 generates the induced electromotive force. In practice, the magnetic member 122 and the coil 124 can be disposed on the protective cover 22.

As shown in FIG. 4B, the magnetic conductor 120 of the invention can be disposed on the frame 290 of the front wheel 29, whereas the magnetic member 122 and the coil 124 can be disposed on the holder 284 of the front wheel 29. When the front wheel 29 is rotating, the distance between the magnetic conductor 120 on the frame 290 and the magnetic member 122 on the holder 284 is changed, so that the coil 124 generates the induced electromotive force.

As shown in FIG. 4C and FIG. 4D, the magnetic member 122 can be disposed on the frame 270 of the rear wheel 27, and the first holder 280 itself is a magnetic conductor, and the coil 124 is disposed on the first holder 280. When the rear wheel 27 is rotating, the distance between the magnetic member 122 on the frame 270 and the first holder 280 is changed, so that the coil 124 generates the induced electromotive force. In practice, the above-mentioned second frame 282 of the rear wheel 27, protective cover 22, and other suitable component can be used to be the magnetic conductor to cooperate with the magnetic member 122 on the frame 270 of the rear wheel 27 to let the coil 124 generate the induced electromotive force.

As shown in FIG. 4E, the magnetic conductor 120 of the invention can be disposed on a gear wheel 234, and the magnetic member 122 and coil 124 can be disposed on the seat tube 24. When the gear wheel 234 is rotating, the distance between the magnetic conductor 120 on the gear wheel 234 and the magnetic member 122 on the seat tube 24 is changed, so that the coil 124 generates the induced electromotive force.

As shown in FIGS. 4F and 4G, the magnetic conductor 120 of the invention can be disposed on a crank arm 21, and the magnetic member 122 and coil (not shown) can be disposed on the down tube 26. When the crank arm 21 rotates, the distance between the magnetic conductor 120 on the crank arm 21 and the magnetic member 122 on the down tube 26 is changed, so that the coil generates the induced electromotive force.

Practically, the magnetic conductor or magnetic member can be disposed on a protruding portion or a recessive portion of a gear wheel structure.

Please note that the positions of the first magnetic conductor, second magnetic conductor and magnetic member can be changed and not limited to the above-mentioned examples. Furthermore, the above-mentioned first magnetic conductor or second magnetic conductor can be the magnetic member. Or, the magnetic member can be disposed on the first magnetic conductor or the second magnetic conductor.

Figure 5:
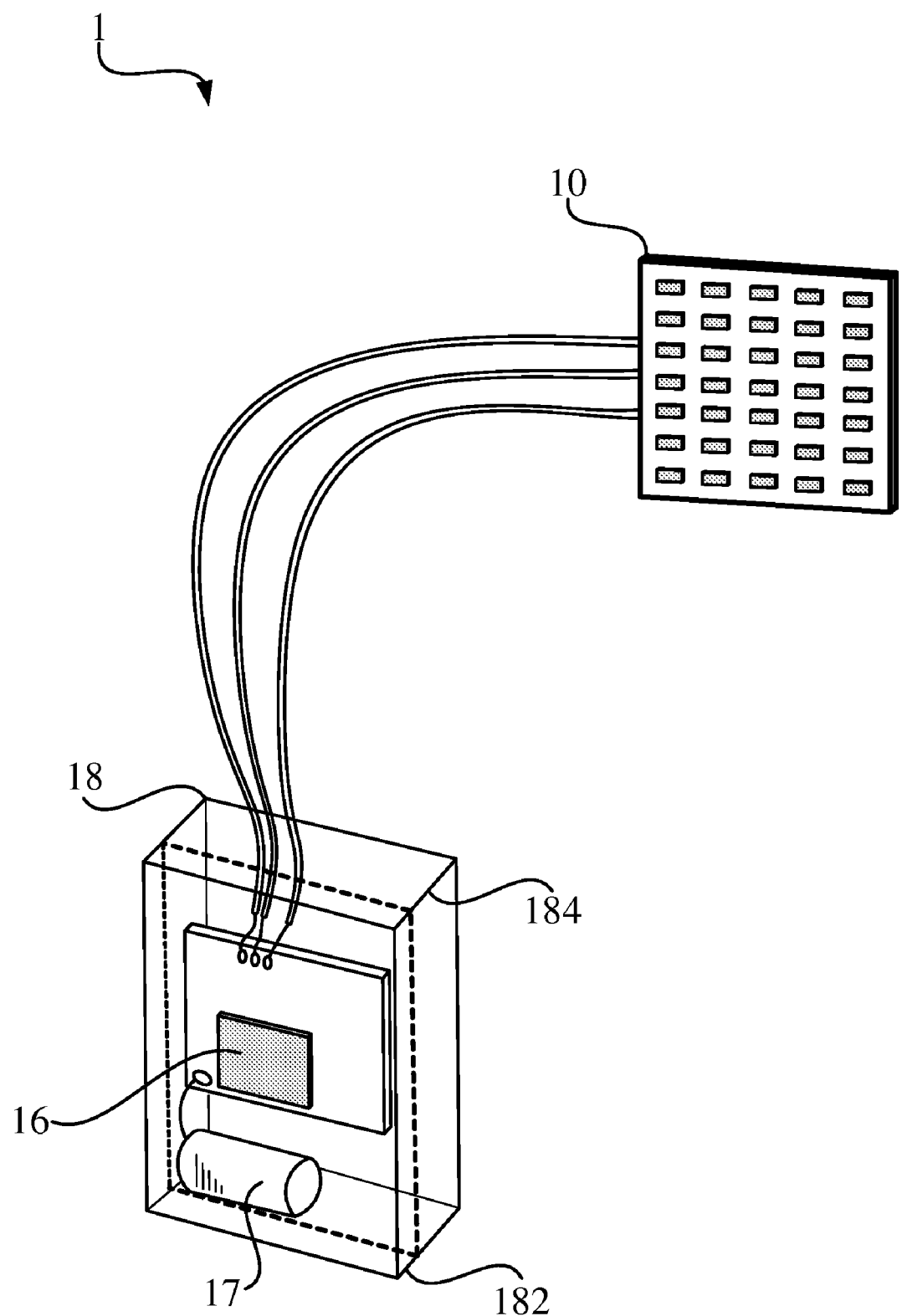
FIG. 5 shows the light-emitting apparatus of an embodiment of the invention.

Please refer to FIG. 5, which shows the light-emitting apparatus of an embodiment of the invention. As shown in FIG. 5, the light-emitting apparatus 1 includes a water-proof enclosure 18, a motion-actuated switch 17 and a controller 16. According to the invention, the water-proof enclosure 18 can be disposed on a suitable position of the bicycle in FIG. 1, such as seat tube 24, cross tube 25, down tube 26 or other positions; or the water-proof enclosure 18 can be disposed on a suitable position with the power-generating module.

Moreover, the motion-actuated switch 17 is mounted in the water-proof enclosure 18 and electrically connected to the controller 16. The motion-actuated switch 17 can generate an activating signal according to a movement of the manpower vehicle, such as vibration. Furthermore, the controller can drive the light-emitting unit 10 to light in accordance with the activating signal. In practice, when the controller 16 does not receive the activating signal within a pre-determined period, it will enter an inactive condition and no longer drives the light-emitting unit to light. Therefore, the light-emitting apparatus 1 can avoid energy consumption in idle time and reach the objectives of energy saving and lifetime extension of the devices of the invention. In addition, the light-emitting apparatus can further include a control switch for resetting the controller 16 from the inactive condition to an active condition.

In practice the water-proof enclosure 18 can keep the above-mentioned electronic elements from being wet, oxidative, or contaminated, and further elongate the life of the electronic elements. An example of the water-proof enclosure 18 is formed by injection molding of resin such as epoxy or plastic material. Furthermore, because of the molding enclosure seals the motion-actuated switch 17 and the controller, it can keep the electronic elements from being wet. Furthermore, said electronic elements can not easily be oxidized. Also shown in FIG. 5, in the embodiment, the water-proof enclosure 18 includes a plastic container 184 and an upper plastic cover 182 bonded with the plastic container 184. Moreover, the water-proof enclosure 18 can be formed by fusing the upper plastic cover 182 to the surroundings of the plastic container 184 by supersonic wave or laser light.

Figure 6:
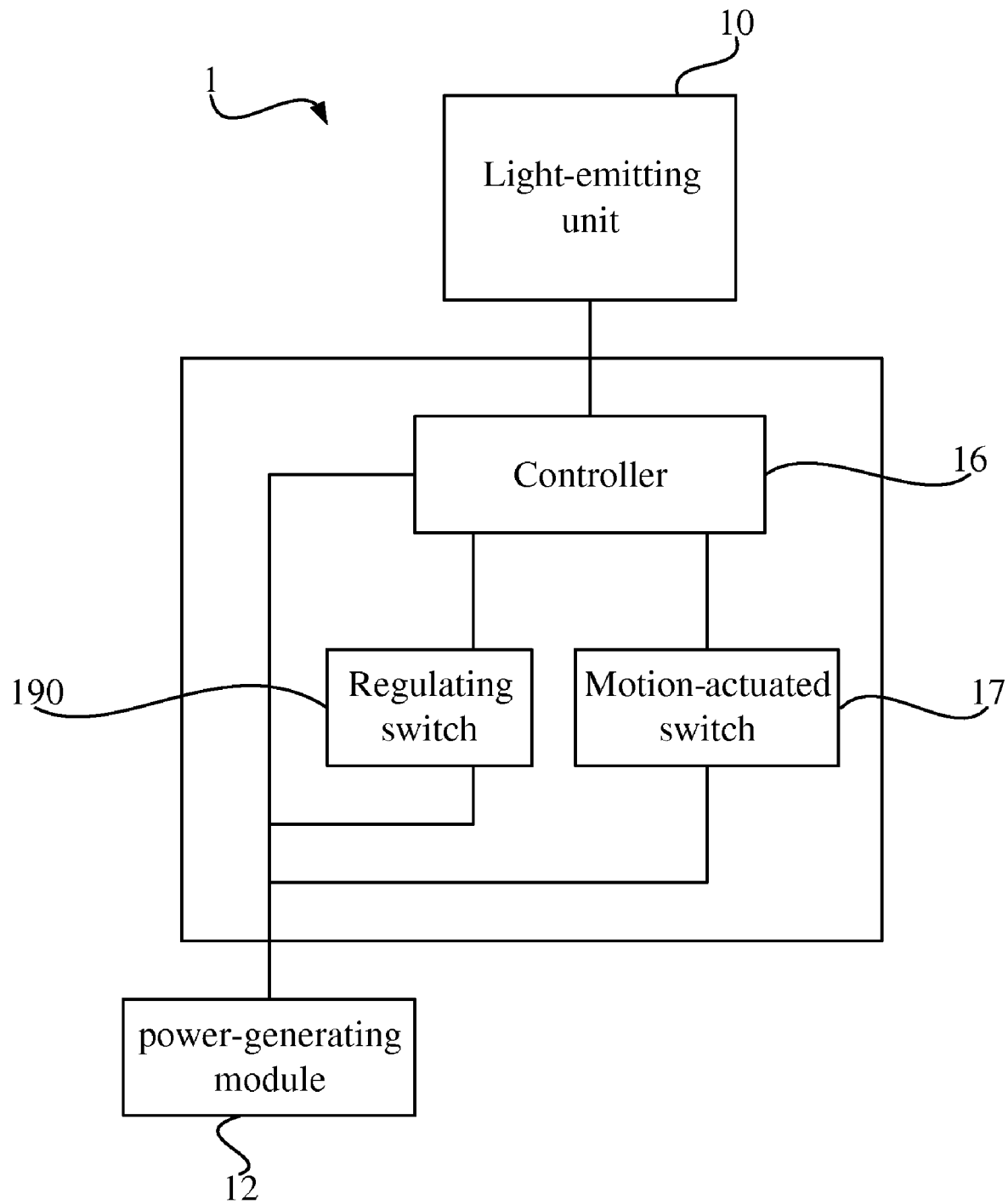
FIG. 6 is a functional view of the light-emitting apparatus of an embodiment of the invention.

Please refer to FIG. 6, a functional view of the light-emitting apparatus of an embodiment of the invention. As shown in FIG. 6, except for the motion-actuated switch 17 and controller 16, the light-emitting apparatus 1 of the invention further includes a regulating switch 190. Moreover, the controller 16 is pre-stored with the at least one lighting sequence. The regulating switch 190 is electrically connected to the controller 16, for selecting one of the at least one lighting sequence to drive the light-emitting unit 10 to light. In practice, the lighting sequence can be the sequence, brightness, ways (such as flashing or continuously lighting), colors of the plurality of LEDs of the light-emitting unit 10.

Figure 7:
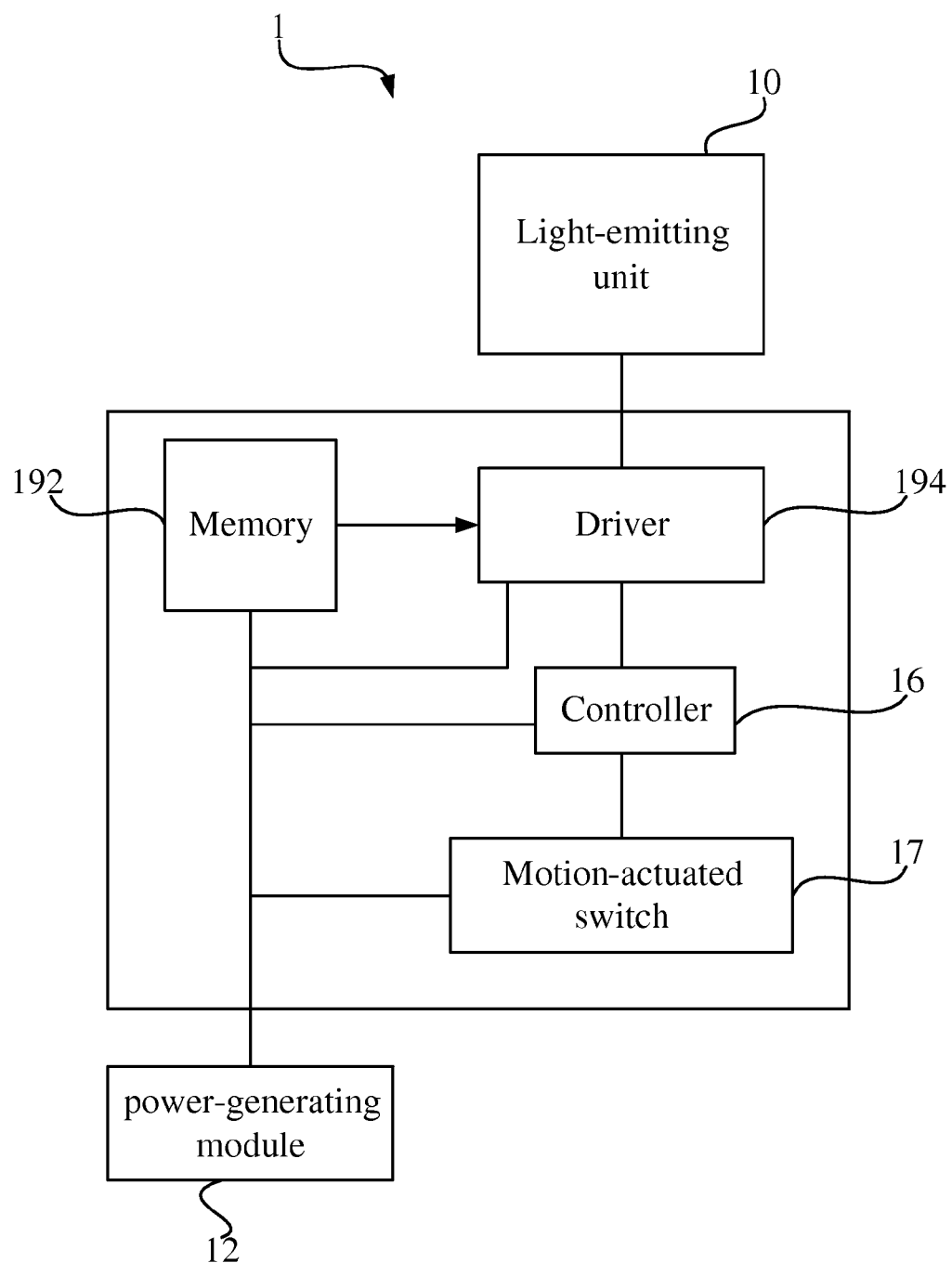
FIG. 7 is a functional view of the light-emitting apparatus of an embodiment of the invention.

Please refer to FIG. 7, a functional view of the light-emitting apparatus of an embodiment of the invention. As shown in FIG. 7, except for the above-mentioned motion-actuated switch 17 and controller 16, the light-emitting apparatus 1 of the invention further includes a memory unit 192 and a driving unit 194.

The memory unit 192 can store a plurality of default patterns, such as letters from A to Z; the numbers from 0 to 9; the symbols, such as ., :, =, >; and other suitable patterns. Furthermore, the default patterns of the invention can be dynamic patterns, such as flashing characters or numbers, so as to provide an attractive effect. The driving unit 194 is electrically connected to the controller 16, the memory unit 192 and the light-emitting unit 10. The driving unit 194 is driven by the controller 16 to select one of the plurality of default patterns in the memory unit 192 in a predetermined way, such as a sequential way, and drive the light-emitting unit 10 according to the default pattern.

Please note that the above-mentioned term sequential way refers to the way the driving unit 15 selects the first default pattern according to the storing sequence or other sequences of the default patterns. For example, when the plurality of default patterns are the letters from A to Z, the driving unit 15 can select the first default pattern according to the sequence from A to Z, the sequence from Z to A, or other sequences. For another example, when the plurality of default patterns are the numbers from 0 to 9, the driving unit 15 can select the first default pattern according to the sequence from 0 to 9, the sequence of odd numbers 1, 3, 5, 7, and 9, the sequence of even numbers 2, 4, 6, and 8, the sequence from 9 to 0, or other sequences.

Figure 8:
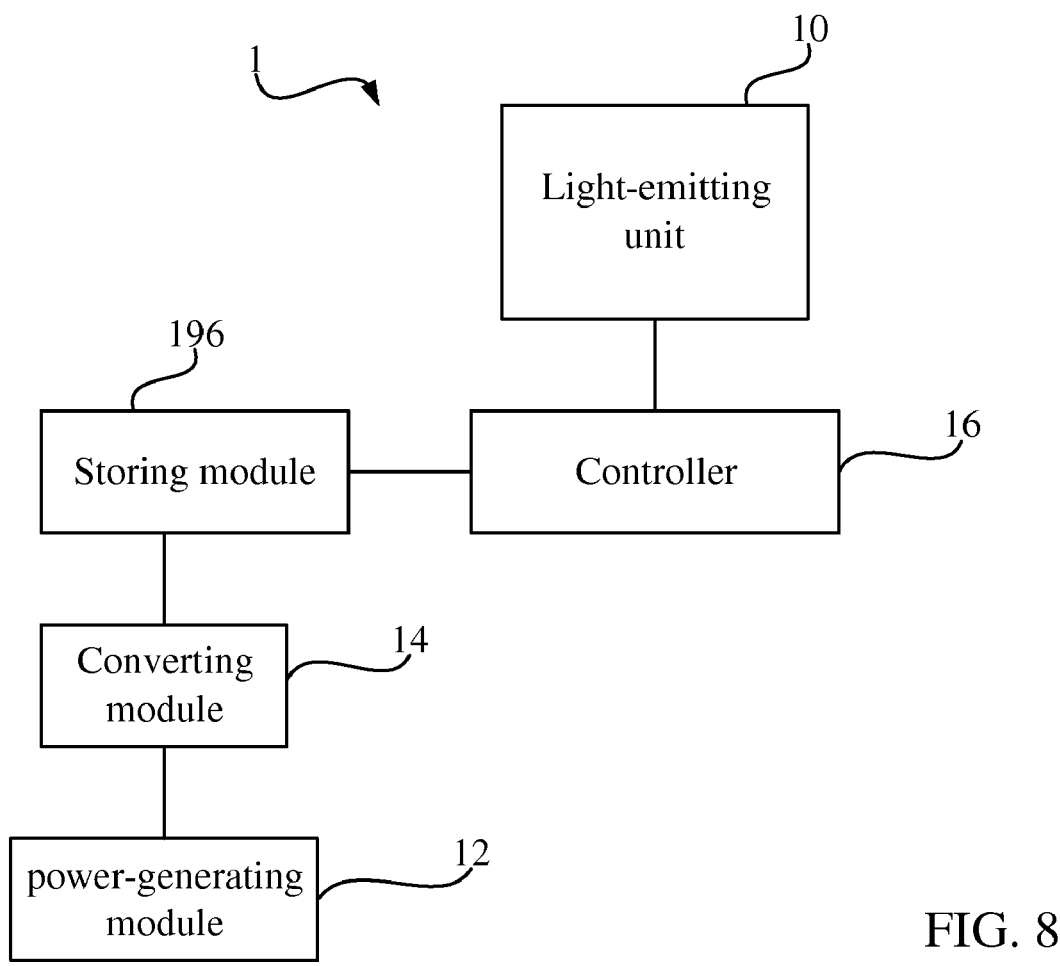
FIG. 8 is a functional view of the light-emitting apparatus of an embodiment of the invention.

Please refer to FIG. 8, a functional view of the light-emitting apparatus of an embodiment of the invention. As shown in FIG. 8, excepts for the above-mentioned power-generating module 12, converting module 14, and controller 16, the light-emitting apparatus 1 of the invention further includes a storing module 196, such as but not limited to, capacitance, batteries, etc. The storing module 196 is electrically connected to the converting module 14 for storing the power of the direct current. Furthermore, the storing module 196 can further be electrically connected to the controller 16 and the light-emitting unit 10 to support the electronic power to said elements.

Please note that the light-emitting apparatus of the invention can optionally include all or parts of the above-mentioned electronic elements. Furthermore, in practice, the above-mentioned motion-actuated switch, controller, regulating switch, memory unit, driving unit, storing module, and other electronic elements can optionally be sealed within the water-proof enclosure to improve the resistance of water, dust, and oxidation.

To sum up, when a user stamps on the pedal of a manpower vehicle, the light-emitting apparatus of the invention can be driven to light, so as to attract people and improve safety and fun. Additionally, the power-generating module of the light-emitting apparatus of the invention can be driven by the operation of the manpower vehicle to generate power needed by the light-emitting apparatus. Therefore, the light-emitting apparatus of the invention can provide illumination in an energy-saving way without a battery.

Although the present invention has been illustrated and described with reference to the preferred embodiment thereof, it should be understood that it is in no way limited to the details of such embodiment but is capable of numerous modifications within the scope of the appended claims.

What is claimed is:

1. A pedal comprising:
    a shaft;
    a main body, connected to the shaft, capable of rotating around the shaft as an axle;
    a light-emitting unit disposed on the main body; and
    a power-generating module comprising:
        a magnetic conductor disposed on the shaft; and
        a magnetic member having a base portion and an elongation portion, wherein the base portion is mounted on the main body, and the elongation portion is elongated from the base portion to the magnetic conductor with a gap between an end of the elongation portion and the magnetic conductor; and
        a coil coupled to the magnetic-member or the magnetic conductor; wherein when the main body rotates around the shaft, the distance of the gap is changed, so that the coil generates an induced electromotive force for supporting the light-emitting unit with needed power.

2. The pedal of claim 1, wherein the magnetic member has an u-shaped structure.

\* \* \* \* \*